(12) United States Patent
Lee (10) Patent No.: US 7,155,118 B2
(45) Date of Patent: Dec. 26, 2006

(54) PORTABLE TERMINAL

(75) Inventor: Chang-Il Lee, Suwon-si (KR)

(73) Assignee: LG Electronics Inc., Seoul (KR)

( * ) Notice: Subject to any disclaimer, the term of this patent is extended or adjusted under 35 U.S.C. 154(b) by 383 days.

(21) Appl. No.: 10/781,912

(22) Filed: Feb. 20, 2004

(65) Prior Publication Data

US 2004/0257752 A1 Dec. 23, 2004

(30) Foreign Application Priority Data

Jun. 16, 2003 (KR) .............. 10-2003-0038875

(51) Int. Cl.
*G03B 29/00* (2006.01)
(52) U.S. Cl. .............. 396/429; 396/383; 348/373
(58) Field of Classification Search ........... 348/333.06, 348/373–376; 396/374, 383, 429, 529
See application file for complete search history.

(56) References Cited

U.S. PATENT DOCUMENTS 5,412,417 A * 5/1995 Tozuka ............... 348/14.01
7,061,536 B1 * 6/2006 Cha ..................... 348/376
2002/0071673 A1 * 6/2002 Kaihara et al. ........... 396/358
2004/0056977 A1 * 3/2004 Kim ..................... 348/376
2004/0090552 A1 * 5/2004 Watanabe et al. ......... 348/373

FOREIGN PATENT DOCUMENTS

KR 2004-0011275 2/2004

* cited by examiner

*Primary Examiner*—W. B. Perkey
*Assistant Examiner*—Rishi Suthar
(74) *Attorney, Agent, or Firm*—Fleshner & Kim, LLP (57) ABSTRACT

The invention relates to a portable terminal, which can include a main body portion, a display portion provided with a display screen and coupled to an end portion of the main body portion to be folded or unfolded with respect to the main body portion. A camera device that can provide an image of an object to the display screen, which can serve as a camera viewfinder, and a cooperating mechanism that can control the camera device to change its sight line cooperatively to the movement of one of the main body portion and the display portion can be included in the portable terminal.

19 Claims, 8 Drawing Sheets

PORTABLE TERMINAL

BACKGROUND OF THE INVENTION

1. Field of the Invention

The present invention relates to a portable terminal, and more particularly, to a camera device mounted to a portable terminal.

2. Background of the Related Art

In general, portable terminal is a device for executing various functions while carried along by persons. For example, the portable terminal may be portable telephone, PDA, etc. Recently, such a portable terminal mounted with a camera has been come into the market.

Figure 1:
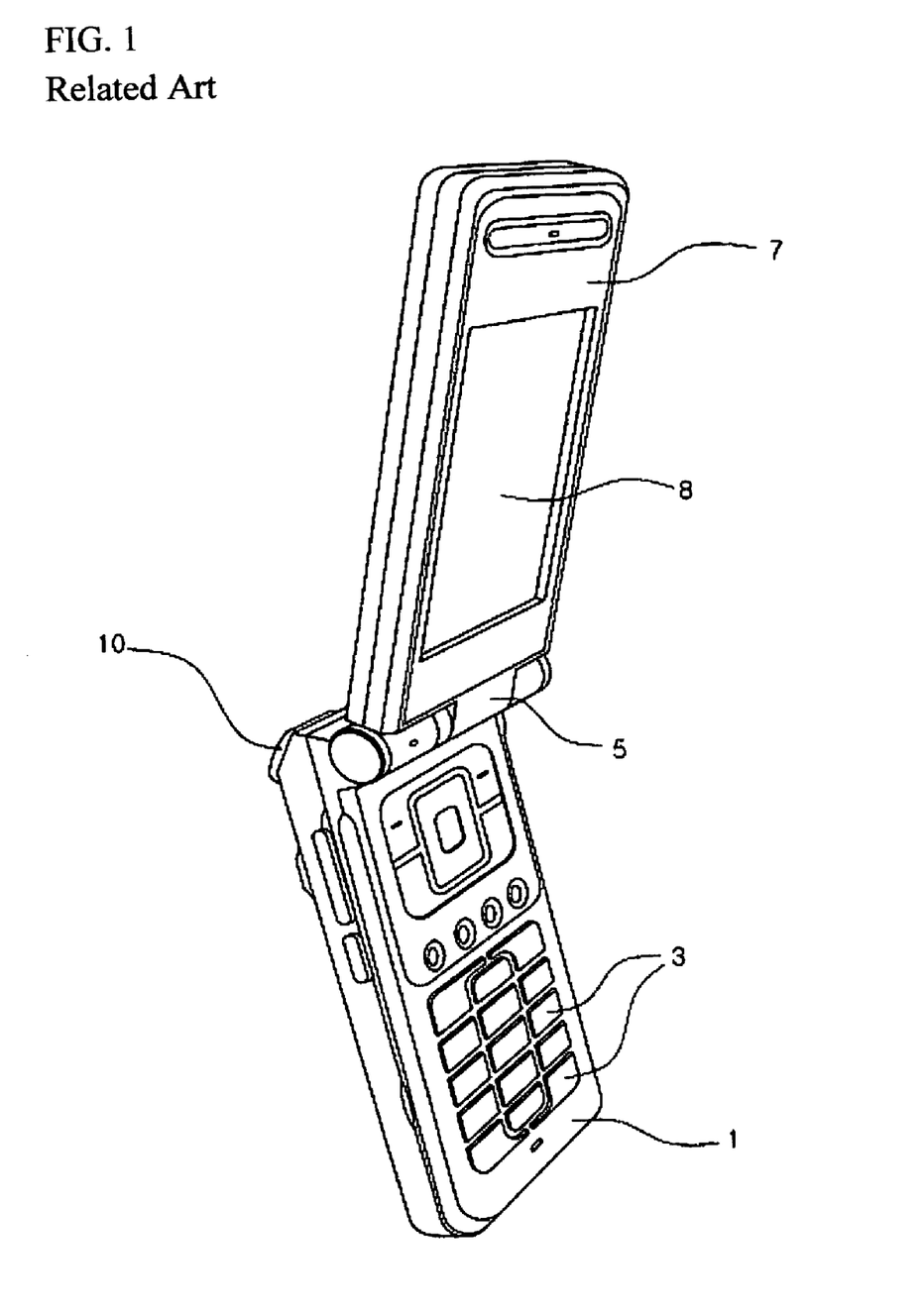
FIG. 1 is a diagram showing a perspective view of a related art portable terminal.

FIG. 1 shows a perspective view of a related art portable terminal having a camera. As shown in FIG. 1, all kinds of components including a main board are provided within the main body portion 1. On the front surface of the main body portion 1, a plurality of keys 3 such as number keys are provided below function keys to input various information.

On one end of the main body portion 1, a hinge unit 5 is provided. Through the hinge unit 5, a display portion 7 is rotatably connected to the main body portion 1. In the display portion, display screen 8 is provided in the surface corresponding to the front surface where the keys 3 are provided. A variety of information is displayed on the display screen.

The display portion 7 can be folded against the front surface of the main body portion 1 so that the display screen is adjacent the keys 3 or unfolded as shown in FIG. 1. According to the type of the hinge unit 5, not only the display portion 7 can be folded or unfolded against the main body portion 1, but the display portion also can be swiveled left and right relative to the front surface of the main body portion 1 in the unfolded position.

In one side of the main body portion 1, generally the side where the main body portion is connected to the display portion 7, a camera 10 is installed. The camera 10 has its sight line (shown by an arrow B in FIG. 2) fixed to face backward of the main body portion 1. Of course, the camera 10 is constituted to freely turn around an axis of its sight line for focusing with respect to the main body portion 1.

Figure 2:
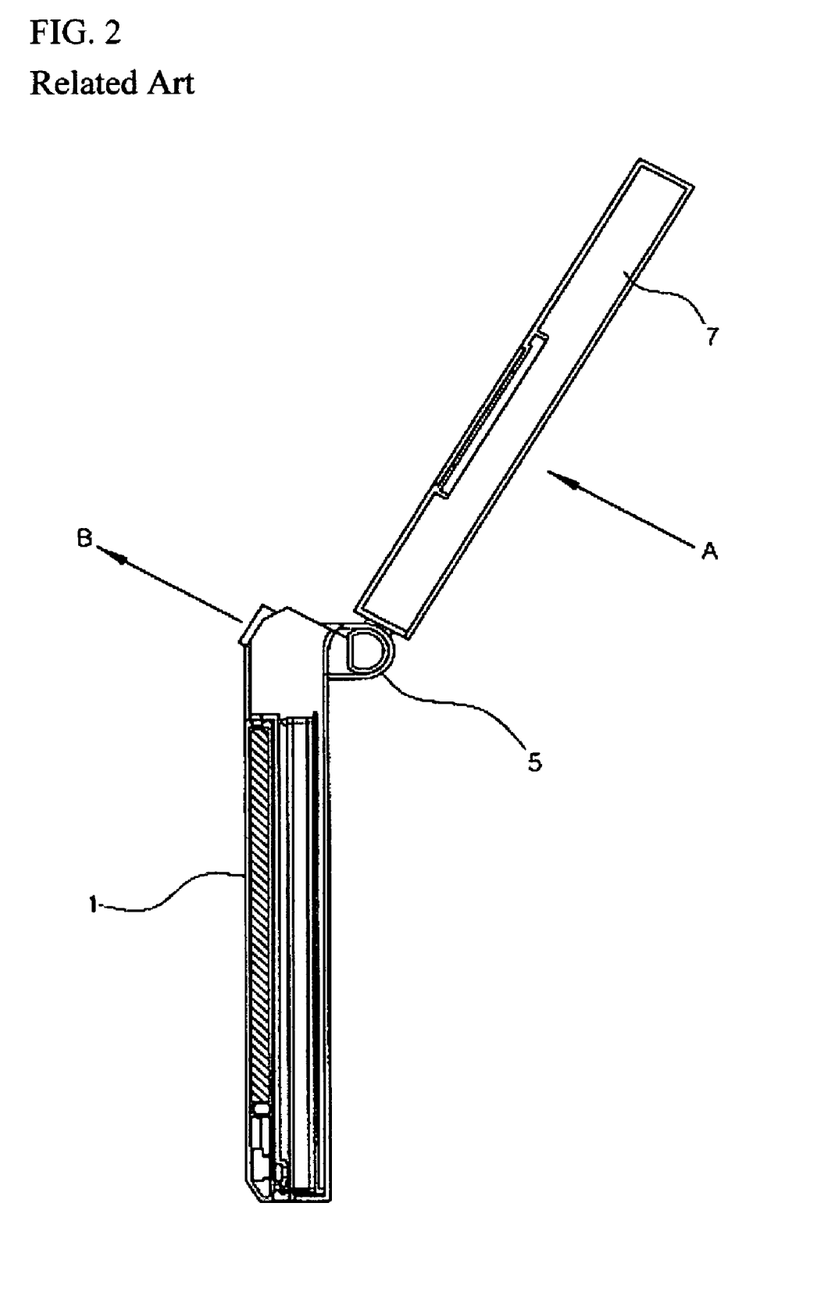
FIG. 2 is a diagram showing a side view of a related art portable terminal in use.

In the related art portable terminal described above, an image captured on the lens of the camera 10 is displayed on the display screen 8 of the display portion 7, which serves as a viewfinder. Accordingly, a user determines the composition of a picture while watching the display screen 8.

As described above, the related art portable terminal has various disadvantages. Since the user determines the composition of a picture while watching the display screen 8, the user places an object of the picture habitually on the extension line of an arrow of a direction orthogonal to the display screen 8. Accordingly, as shown in FIG. 2, the sight line of the camera 10 is parallel to the direction orthogonal to the surface of the display screen 8 when the display portion 7 is filly unfolded with respect to the main body portion 1. However, in the related art, when a user tries to take a picture in a state of the portable terminal where the display portion 7 is not fully unfolded, the sight line of the camera 10 and the direction orthogonal to the surface of the display screen 8 are not parallel to each other so that the user has difficulty in correctly displaying an object on the display screen. For example, where a display screen is configured to freely rotate with respect to a main body portion, it would be inconvenient for a user to move or rotate the camera in this way and in that way in order to correctly display an object on the display screen.

The above references are incorporated by reference herein where appropriate for appropriate teachings of additional or alternative details, features and/or technical background.

SUMMARY OF THE INVENTION

An object of the invention is to solve at least the above problems and/or disadvantages and to provide at least the advantages described hereinafter.

An object of the present invention is to provide a portable terminal that is capable of providing a camera with a prescribed relationship to a rotatable display unit of the portable terminal.

Another object of the present invention is to provide a portable terminal that is capable of making the sight line of a camera cooperate correspondingly to the unfolded extent of a display portion.

Another object of the present invention is to provide a portable terminal that is capable of having the sight line of a camera and the direction orthogonal to the surface of a display screen, which operates as a viewfinder, always parallel to each other.

In order to achieve at least the above objects and advantages in a whole or in part, in accordance with one aspect of the present invention there is provided a cam structure that includes a driving cam provided on a side of a first body, a follower cam provided on a side of a second body that cooperates with the driving cam and a member installed in the second body and configured to provide resistant force to the rotation of a second body, wherein the follower cam rotates cooperatively with the rotation of the driving cam while overcoming the resilient force of the resilient member in the course of rotation of the driving cam.

To further achieve at least the above objects in a whole or in part, in accordance with on aspect of the present invention there is provided a portable terminal that includes a flip-type phone having first and second units and a camera coupled to move in relation to movement of one of said units.

To further achieve at least the above objects and advantages in a whole or in part, in accordance with one aspect of the present invention there is provided a portable terminal that includes a camera configured to provide an image of an object to a display screen and a cooperating mechanism configured to move the camera in relation to the display screen.

To further achieve at least the above objects and advantages in a whole or in part, in accordance with one aspect of the present invention there is provided a method that includes providing a camera in a flip type phone having a display in first body that is rotatably coupled to a second body and moving the camera in a prescribed relationship to movements of the first body.

To further achieve at least the above objects and advantages in a whole or in part, in accordance with one aspect of the present invention there is provided a portable terminal that includes a main body portion, a display portion provided with a display screen and rotatably coupled to the main body portion to be folded or unfolded with respect to the main body portion, a camera configured to provide an image of an object to the display screen, and a cooperating mechanism configured to cause the camera to change its sight line in response to movement of the display portion.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein.

DETAILED DESCRIPTION OF PREFERRED EMBODIMENTS

Figure 3A:
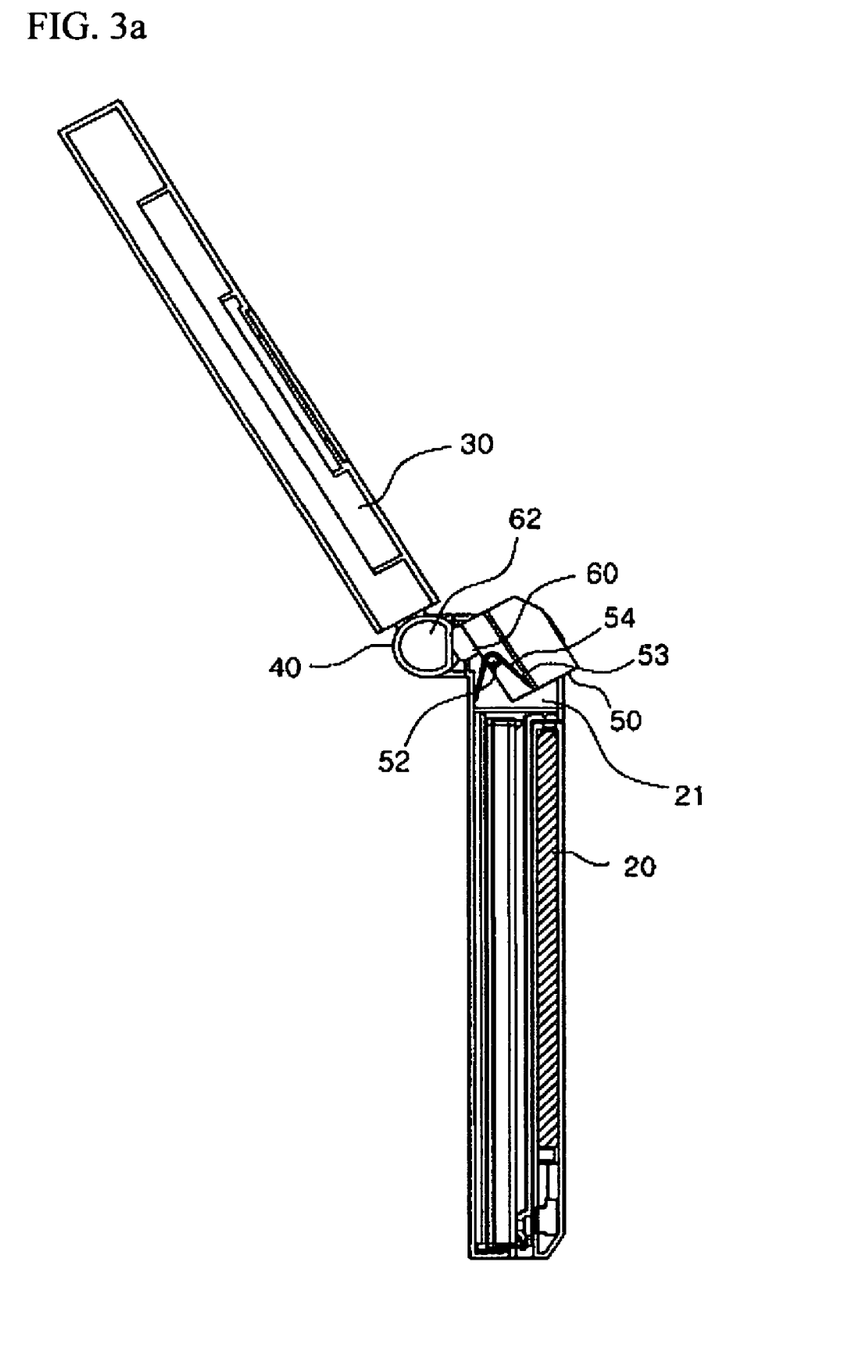
FIG. 3a is a diagram showing a schematic cross sectional side view of a structure of a preferred embodiment of a portable terminal provided with camera device according to the present invention where a display portion thereof is unfolded with respect to its main body.
Figure 3B:
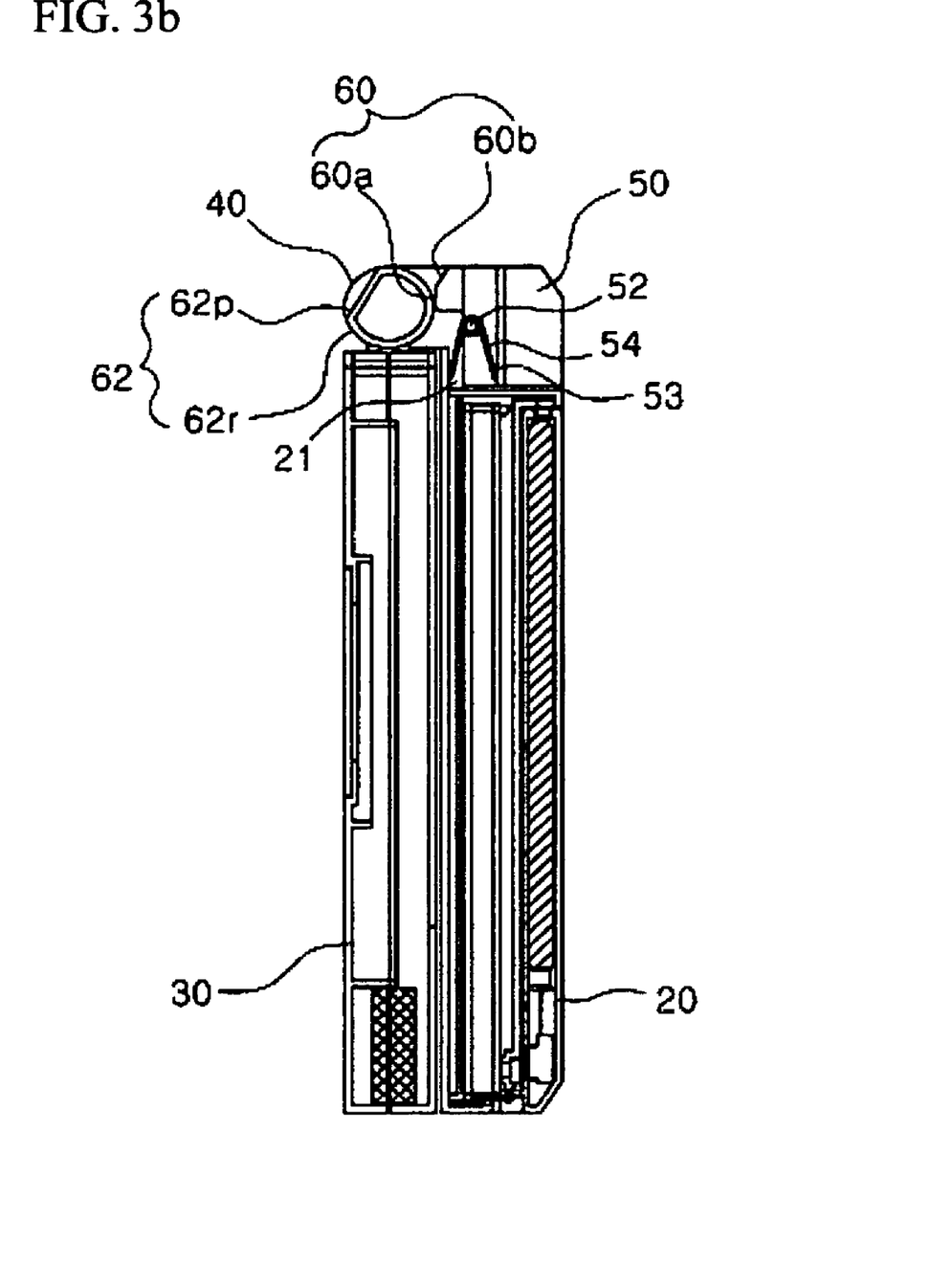
FIG. 3b is a diagram showing a schematic cross sectional side view of a preferred embodiment of a portable terminal provided with a camera device according to the present invention where a display portion thereof is folded against its main body.
Figure 3C:
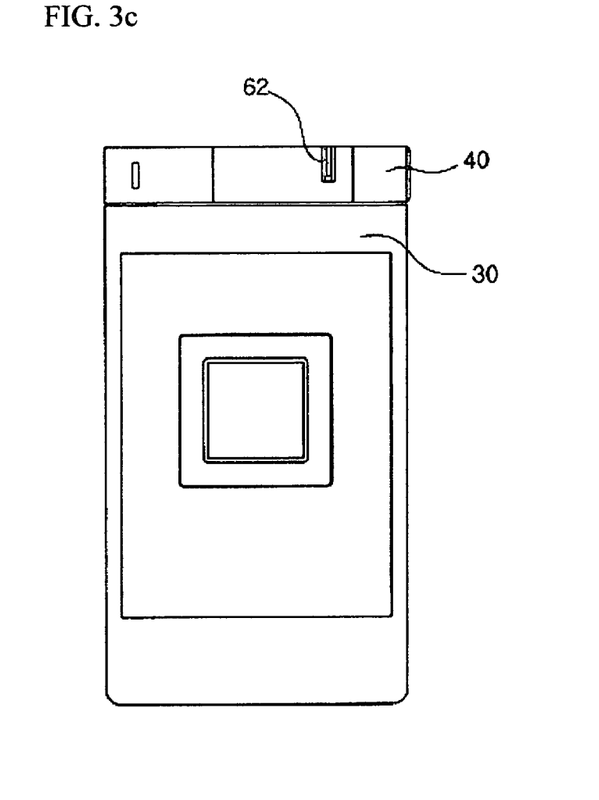
FIG. 3c is a diagram showing a front view of a preferred embodiment of a portable terminal provided with a camera device according to the present invention.
Figure 3D:
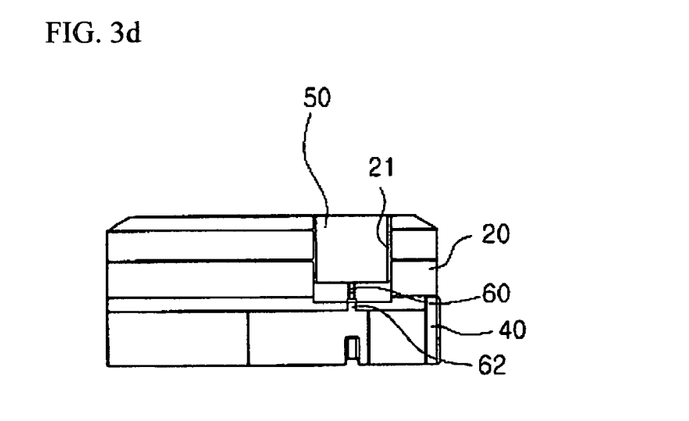
FIG. 3d is a diagram showing a plan view of a related art portable terminal provided with a camera device according to the present invention.
Figure 3E:
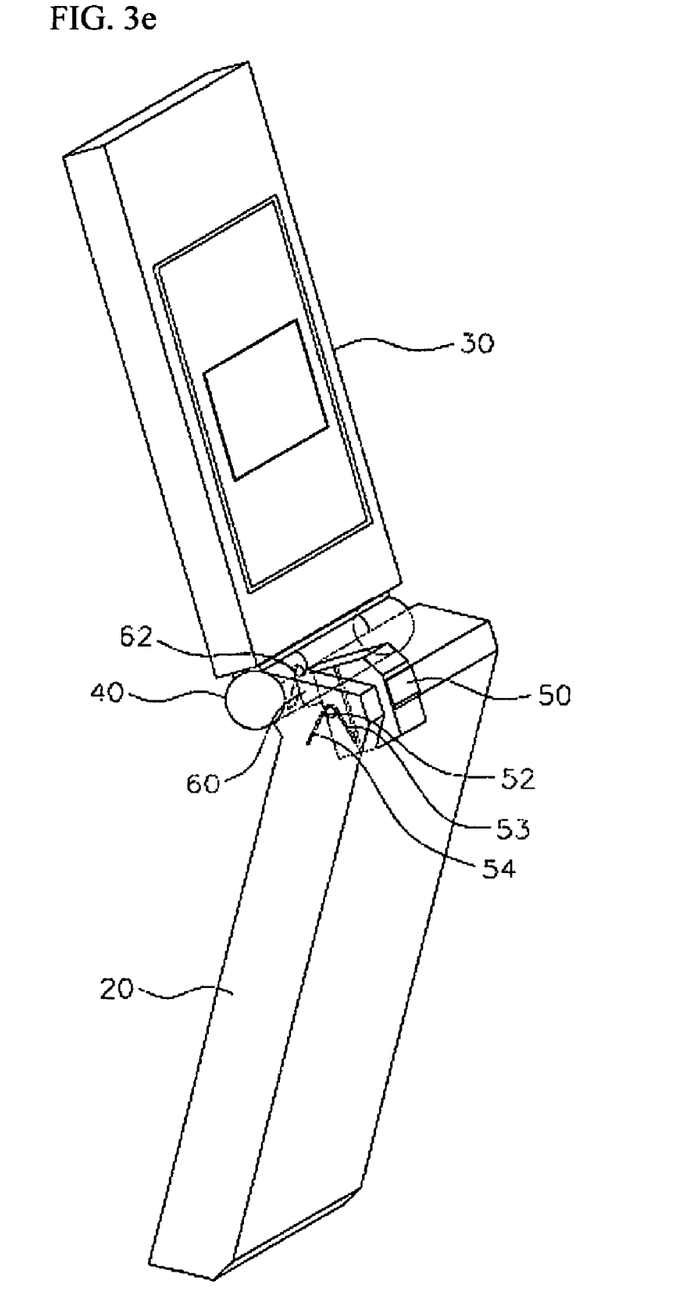
FIG. 3e is a diagram showing a perspective view a preferred embodiment of a portable terminal according to the present invention.

In FIG. 3a, the structure of a portable terminal provided with an embodiment of a camera device according to the present invention wherein the display portion thereof is unfolded with respect to its main body is shown in a schematic cross sectional view. In FIG. 3b, the structure of a portable terminal provided with an embodiment of a camera device according to the present invention wherein the display portion thereof is folded against its main body is shown in a schematic cross sectional view. In FIG. 3c, a front view of a folder type portable terminal provided with a camera device according to an embodiment of the present invention is shown. In FIG. 3d, a plan view of a portable terminal provided with a camera device according to an embodiment of the present invention is shown. FIG. 3e is a perspective view showing an embodiment of the present invention.

As shown in FIGS. 3a–3e, a main body portion 20 of an embodiment of a portable terminal according to the present invention has an approximately flat cube shape. Various kinds of known prior art components constituting the portable terminal are provided within the main body portion 20. For example, a main board, a communication module and the like may be provided. However, the present invention is not intended to be so limited. On the front surface of the main body portion 20, a plurality of keys including function keys (not shown) can be provided.

A display portion 30 can be coupled to one side of the main body portion 20. The display portion 30 has a display screen (not shown) on the surface that corresponds to the front surface of the main body portion 20. The display screen serves to display all kinds of information as well as serving as a viewfinder as described below.

The main body portion 20 and the display portion 30 can be rotatably coupled to each other by various known prior art devices such as a hinge unit 40. The hinge unit 40 can be integrally provided to the main body portion 20 and display portion 30, respectively. Depending on design, the hinge unit 40 could be operated to fold or unfold the display portion 30 with respect to the main body portion 20 and swivel the display portion 30 about an axis in a direction orthogonal to the rotation axis about which the display portion 30 is folded or unfolded relative to the main body portion 20.

On one side of the main body portion 20, a camera chamber 21 can be formed. The camera chamber 21 is preferably provided in the upper end of the main body 20 portion to open in a direction of a rear or upper surface of the main body 20.

In the camera chamber 21, a camera 50 can be secured or seated. The camera 50 can have at least a lens so as to provide an image of an object to the display portion 30 and the main body portion 20. On both sides of outer surfaces of the camera 50, hinge pin 52 or the like can be provided. The hinge pin 52 can rotatably install the camera 50 inside the camera chamber 21. For example, the hinge pin 52 can be inserted through a hinge hole (not shown) formed in the inner wall of the camera chamber 21 so as to rotate there about.

On the outer surface of the camera 50, a spring rest 53 can be formed. On the spring rest 53, one end of a spring 54 can be supported. Accordingly, the spring 54 can provide resilient force for rotating the camera 50 about the hinge pin 52 in one direction. For this reason, the other end of the spring 54 can be supported on one side of the camera chamber 21. It is preferred that the spring 54 can be provided on both ends of the camera 50 for the stability of the spring 54.

The spring 54 is shown as a torsion spring in embodiments of a portable terminal according to the present embodiment. However, the present invention is not intended to be so limited. For example, the spring 54 does not have to limited to such torsion spring nor have to be necessarily installed as shown. Any type of spring or different resistant device will do if it provides a resilient force to the camera in a designated direction.

In addition, in the side of the display portion 30, a driving cam 62 can be provided to rotate with a follower cam 60. The driving cam 62 is preferably provided near the side of the hinge unit 40 as shown in FIGS. 3a–3e. Thus, on the component of the hinge unit 40 rotating integrally with the display portion 30, the driving cam 62 can be formed. However, it should not be limited to such structure. Alternatively, driving cam 62 can be provided to the display portion 30 regardless of the structure of the hinge unit 40.

As shown for example in FIG. 3b, the driving cam 62 can include a curved surface portion 62r having a predetermined curvature, and a plane portion 62p formed flat. For example, around the circumference of the rotating portion of a hinge unit, curved surface portion 62r and plane portion 62p are continuously formed. The follower cam 60 can include a first plane (e.g., flat) portion 60a and a second plane portion 60b.

Figure 4A:
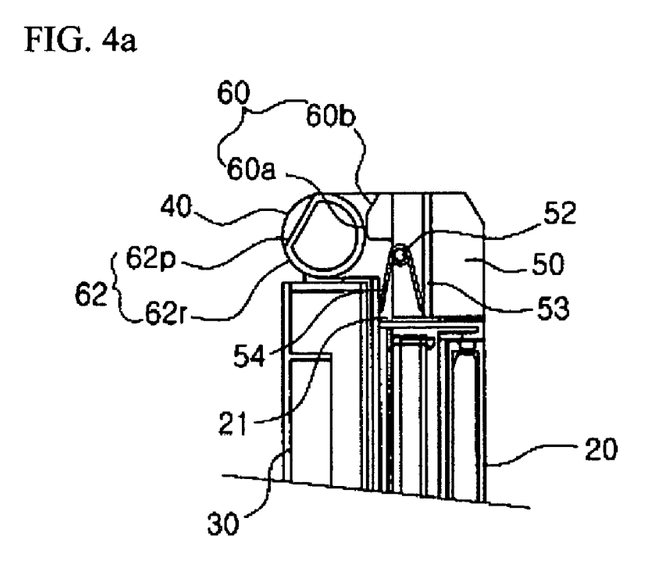
FIG. 4a is a diagram showing an operational state of a preferred embodiment of the present invention where the display portion thereof is folded against its main body.

Operations of a camera device of a folder type embodiment of a portable terminal according to the present invention will now be described. First, in a state shown in FIG. 4a, the front surface of the main body portion 20 can be opposed to the display screen of the display portion 30, that is, display portion 30 is folded against the main body portion 20. At this time, the curved surface portion 62r can contact the first plane portion 60a of the follower cam 60. In such state, the spring 54 can be elastically deformed so that both ends of the spring are adjacent to each other.

In this state, when a user unfolds the display portion 30 with respect to the main body portion 20, the first plane portion 60a of the follower cam 60 and the curved plane portion 62r can be guided to each other. When the plane portion 62p meets the follower cam 60, the camera 50 rotates about the hinge pin 52 (e.g., in a counter clockwise shown in FIG. 4a) using the restoring force of the spring 54.

Figure 4B:
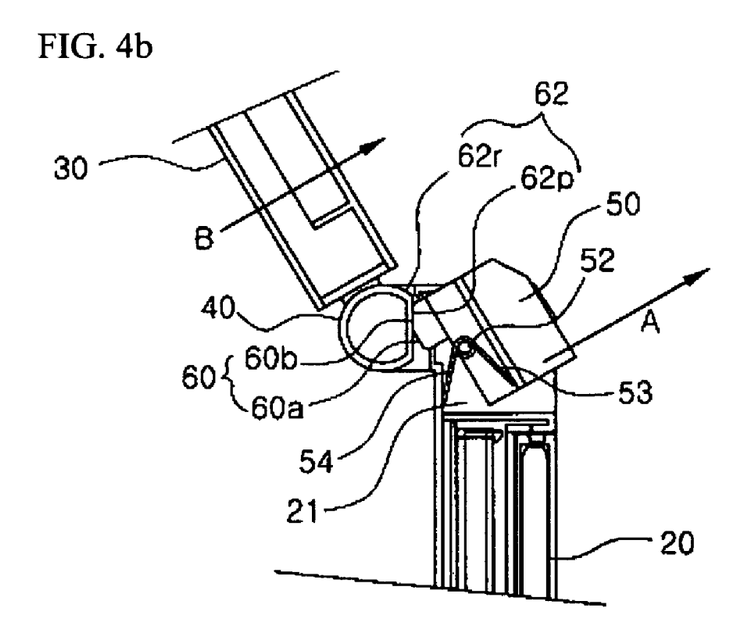
FIG. 4b is a diagram showing an operational state of a preferred embodiment of the present invention where the display portion thereof is fully unfolded from its main body.

When operating as described above, a second plane portion 60b of the follower cam 60 and a plane portion 62p of the driving cam 62 can come into contact with each other. Preferably, while the second plane portion 60b of the follower cam 60 and the plane portion 62p of the driving cam 62 are guided and contacted to each other, the sight line (arrow A) of the camera 40 and the direction orthogonal to the surface of the display portion 30 (e.g., preferably the display screen) are parallel to each other.

Figure 4C:
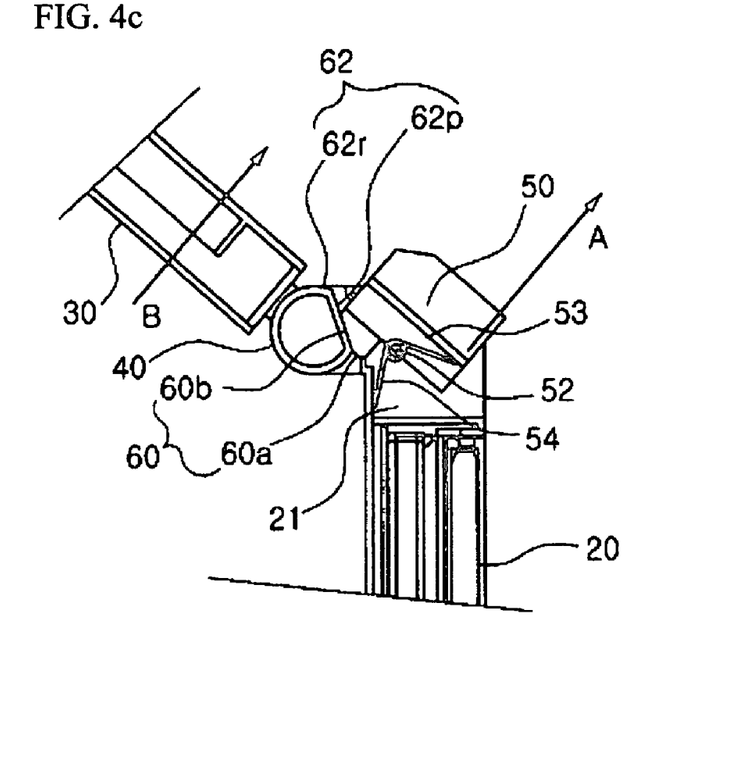
FIG. 4c is a view showing the operational state of a preferred embodiment of the present invention where the display portion thereof is not fully unfolded from its main body.

Accordingly, between the state wherein the display portion 30 is unfolded more than a predetermined angle with respect to the main body portion 20 (e.g., the state where a user can usually see the display screen of the display portion 30 while the user holds the main body portion 20 such as about 90°) and the state wherein the display portion 30 is fully unfolded (e.g., 180°), the second plane portion 60b of the follower cam 60 and the plane portion 62p of the driving cam 62 contact each other to rotate the camera 50 together (e.g., a prescribed relationship) with the rotation of the display portion 30. For example, the second plane portion 60b of the follower cam 60 and the plane portion 62p of the driving cam 62 contact each other continuously at that time. Of course, the sight line of the camera 40 and the direction orthogonal to the surface of the surface of the display screen can be maintained parallel to each other. Such a state at an exemplary angle is shown in FIG. 4c.

Figure 4D:
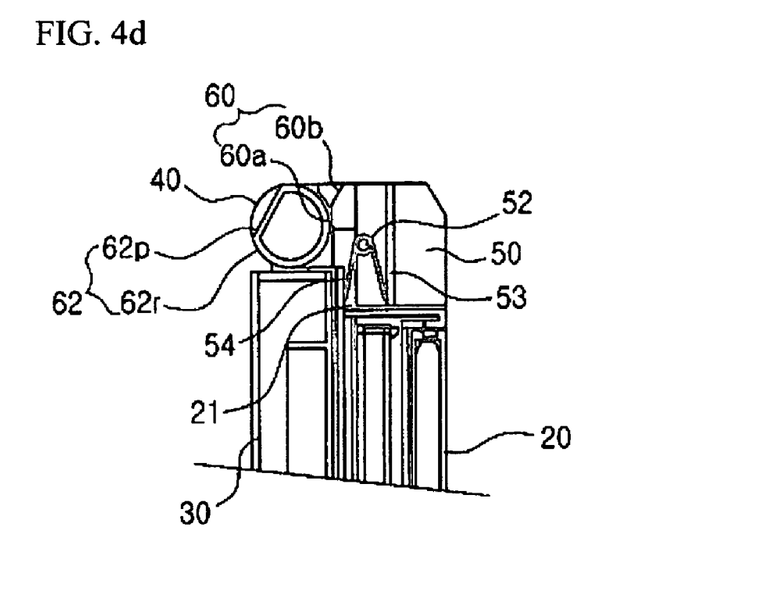
FIG. 4d is a diagram showing an operational state of a preferred embodiment of a portable terminal according to the present invention where the display portion thereof is swiveled so as to expose its display screen outside.

As shown in FIG. 4d, the display portion 30 can be swiveled and rotated (e.g., folded) relative to the main body portion 20 so that the display portion 30 is folded against the main body portion 20. As shown in FIG. 4d, the display screen of the display portion 30 can be exposed to the outside such that a user can use the display screen as a viewfinder in a folded position of the portable terminal. Thereby, also in a state shown in FIG. 4d, an object can have its picture taken by the camera 50. In such a state, similar to the state shown in FIG. 4a, the first plane portion 60a of the follower cam 60 and the curved surface portion 62r of the driving cam 62 can be guided to each other. Further, a sight line of the camera 50 and the direction orthogonal to the surface of the display screen are parallel in FIG. 4d.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments. Furthermore, for ease of understanding, certain method procedures may have been delineated as separate procedures; however, these separately delineated procedures should not be construed as necessarily order dependent in their performance. That is, some procedures may be able to be performed in an alternative ordering, simultaneously, etc.

As described above, embodiments of a portable terminal including a camera device, a camera apparatus for a portable terminal and methods of using same have various advantages. In embodiments of a portable terminal and methods thereof according to the present invention, a sight line of the camera can be changed according to the position of a display portion that can be rotated or positioned with respect to the main body portion. For example, since the sight line of the camera and the direction orthogonal to the surface of the display screen, which can serve as a camera viewfinder, can be maintained substantially parallel to each other the user can use the camera more conveniently.

The foregoing embodiments and advantages are merely exemplary and are not to be construed as limiting the present invention. For example, the spring 54 does not necessarily have to be a torsion spring. Also, the position of the camera may not be limited to the main body portion 20 by adequately structuring or designing the follower cam 60 and driving cam 62. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

What is claimed is:

1. A cam structure, comprising:
   a driving cam provided on a side of a first body;
   a follower cam provided on a side of a second body that cooperates with the driving cam; and
   a member installed in the second body and configured to provide resistant force to the rotation of a second body,
   wherein the follower cam rotates cooperatively with the rotation of the driving cam while overcoming the resilient force of the resistant member in the course of rotation of the driving cam, wherein the follower cam is comprised of a first plane portion and a second plane portion inclined with respect to the first plane portion, and wherein the driving cam is comprised of a plane portion and a curved surface portion, wherein the second plane portion of the follower cam abuts against the plane portion of the driving cam such that the follower cam and the driving cam cooperatively rotate, and wherein the first body and the second body are respectively a display unit and a camera in a main unit rotatably coupled together in a flip-type portable terminal.

2. The cam structure of claim 1, wherein when the follower cam rotates cooperatively to the rotation of the driving cam, a direction perpendicular to the first body and a sight line of the camera are maintained substantially parallel to each other, and wherein a display in the display unit operates as a viewfinder to the camera.

3. The cam structure of claim 1, wherein when the follower cam rotates cooperatively to the rotation of the driving cam, the first body and the second body are maintained parallel to each other.

4. The cam structure of claim 1, wherein a direction orthogonal to the surface of a display screen of the display unit and a sight line of the camera are parallel to each other.

5. The cam structure of claim 4, wherein the direction orthogonal to the surface of the display screen and the sight line of the camera are parallel to each other when the first and second bodies are separated by an obtuse angle.

6. The cam structure of claim 4, wherein the direction orthogonal to the surface of the display screen and the sight line of the camera are parallel to each other when the first body and the second body are rotatably separated by 90 to 180 degrees.

7. The cam structure of claim 4, wherein the direction orthogonal to the surface of the display screen and the sight line of the camera are parallel to each other when the first body and second body are closed and the display unit is facing away from the second body.

8. The cam structure of claim 4, wherein in a state that the display unit is unfolded to some degree with respect to the second body, the direction orthogonal to a surface of a display screen provided on the display unit and the sight line of the camera are parallel to each other.

9. The cam structure of claim 1, wherein the driving cam is provided in a side of a hinge unit that rotates integrally with the first body.

10. The cam structure of claim 9, wherein in a side of the second body, a camera chamber is recessively formed, and the camera is seated therein.

11. A cam structure, comprising:
a driving cam provided on a side of a first body;
a follower cam provided on a side of a second body that cooperates with the driving cam; and
a member installed in the second body and configured to provide urging force to the rotation of a second body,
wherein the follower cam rotates cooperatively with the rotation of the driving cam while overcoming the urging force of the urging member in the course of rotation of the driving cam, wherein the follower cam is comprised of a first following portion and a second following portion inclined with respect to the first following portion, and wherein the driving cam is comprised of a first driving portion and a second driving portion, wherein the second following portion of the follower cam engages the first driving portion of the driving cam such that the follower cam and the driving cam cooperatively rotate, and wherein the first body and the second body are respectively a display unit and a camera in a main unit rotatably coupled together in a flip-type portable terminal.

12. The cam structure of claim 11, wherein when the follower cam rotates cooperatively to the rotation of the driving cam, a direction perpendicular to the first body and a sight line of the camera are maintained substantially parallel to each other, and wherein a display in the display unit operates as a viewfinder to the camera.

13. The cam structure of claim 11, wherein when the follower cam rotates cooperatively to the rotation of the driving cam, the first body and the second body are maintained parallel to each other.

14. The cam structure of claim 11, wherein a direction orthogonal to the surface of a display screen of the display unit and a sight line of the camera are parallel to each other.

15. The cam structure of claim 14, wherein the direction orthogonal to the surface of the display screen and the sight line of the camera are parallel to each other when the first and second bodies are separated by an obtuse angle.

16. The cam structure of claim 14, wherein the direction orthogonal to the surface of the display screen and the sight line of the camera are parallel to each other when the first body and the second body are rotatably separated by 90 to 180 degrees.

17. The cam structure of claim 14, wherein the direction orthogonal to the surface of the display screen and the sight line of the camera parallel to each other when the first body and second body are closed and the display unit is facing away from the second body.

18. The cam structure of claim 14, wherein in a state that the display unit is unfolded to some degree with respect to the second body, the direction orthogonal to a surface of a display screen provided on the display unit and the sight line of the camera are parallel to each other.

19. A cam structure, comprising:
driving cam means for rotating provided on a side of a first body;
follower cam means provided on a side of a second body for cooperating with the driving cam means; and
urging member means installed in the second body for providing urging force to the rotation of a second body,
wherein the follower cam means rotates cooperatively with the rotation of the driving cam means while overcoming the urging force of the urging member means in the course of rotation of the driving cam means, wherein the follower cam means is comprised of a first following means and a second following means separate from the first following means, and wherein the driving cam means is comprised of a first driving means and a second driving means, wherein the second following means of the follower cam means abuts against the first driving means of the driving cam means such that the follower cam means and the driving cam means cooperatively rotate, and wherein the first body and the second body are respectively a display unit and a camera in a main unit rotatably coupled together in a flip-type portable terminal.

* * * * *